June 25, 1963          B. F. HAIR          3,095,213
LOW ENERGY LOAD LEVELING VEHICLE SUSPENSION
Filed June 9, 1961          3 Sheets—Sheet 1
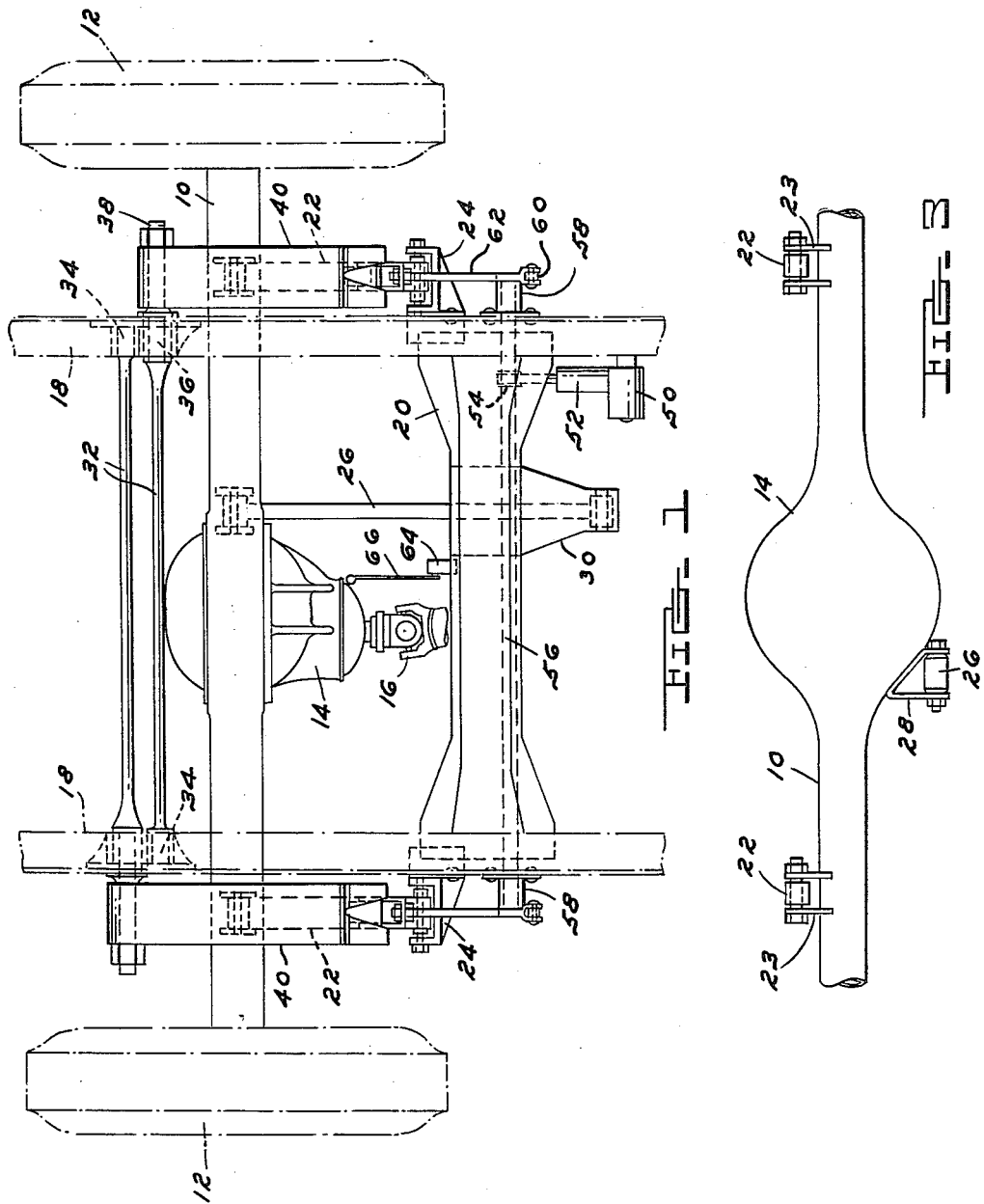
BENJAMIN F. HAIR
INVENTOR.
BY John R. Faulkner
Clifford L. Sadler
ATTORNEYS June 25, 1963  B. F. HAIR  3,095,213
LOW ENERGY LOAD LEVELING VEHICLE SUSPENSION
Filed June 9, 1961  3 Sheets-Sheet 2
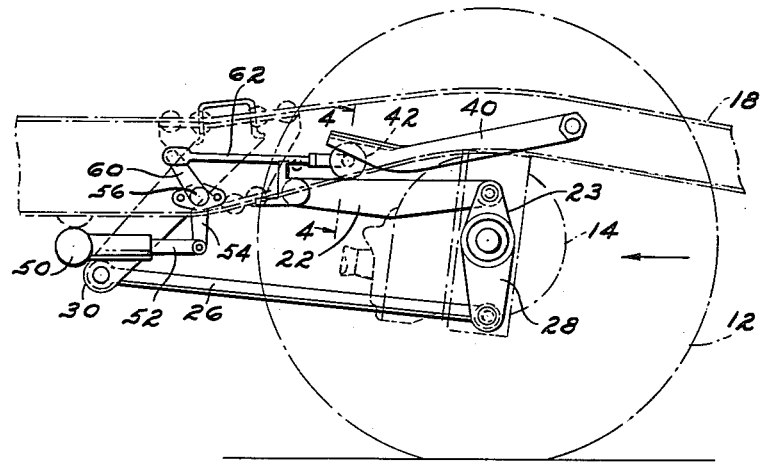
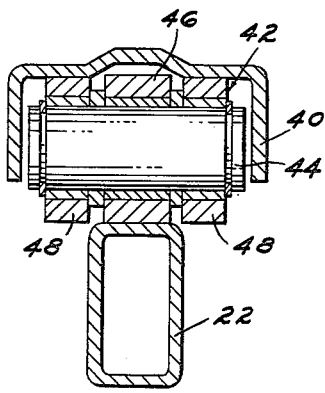
BENJAMIN F. HAIR
*INVENTOR.*
BY John R. Faulkner
Clifford L. Sadler
ATTORNEYS June 25, 1963 B. F. HAIR 3,095,213
LOW ENERGY LOAD LEVELING VEHICLE SUSPENSION
Filed June 9, 1961 3 Sheets-Sheet 3

BENJAMIN F. HAIR
INVENTOR.

BY John R. Faulkner
Clifford L. Sadler
ATTORNEYS

United States Patent Office 3,095,213
Patented June 25, 1963

3,095,213
LOW ENERGY LOAD LEVELING VEHICLE
SUSPENSION
Benjamin F. Hair, Dearborn, Mich., assignor to Ford
Motor Company, Dearborn, Mich., a corporation of
Delaware
Filed June 9, 1961, Ser. No. 115,949
3 Claims. (Cl. 280—124)

The present invention relates to vehicle suspension systems and more particularly to a suspension system adapted to level a vehicle in the event of load changes.

The desirability of a suspension system which will compensate for changes in load in order to maintain a vehicle at a constant height has long been appreciated. In a passenger vehicle having relatively soft springing, considerable sag occurs when a full load of passengers and trunk load are added. In such circumstances, a level car is desirable for ride and handling reasons, and in addition, for styling reasons.

Load leveling in trucks is also highly desirable. The tremendous difference between net and gross vehicle weights points up the necessity for a leveling system for commercial vehicles.

Many load leveling suspension arrangements have been proposed. In the conventional leveling system, an auxiliary spring is provided in association with a main suspension spring. Mechanical actuating means are provided to add energy to the auxiliary springs to supplement the main spring. This additional spring energy introduced into the system causes an increase in vehicle height. In some conventional systems, the energy is added directly to the main suspension springs.

The present invention proposes a low energy load leveling vehicle suspension system employing torsion bar members as the main suspension spring elements. The vehicle chassis is supported on the axle by load arms extending from the torsion bar ends. An intermediate member is provided to control the effective load arm length. By changing the effective lever arm length, the mechanical advantage through which the suspension spring operates can be controlled. As a result, in the event of a load change, rather than loading or unloading an auxiliary spring, the intermediate member is shifted to vary the effective arm length through which the load arm functions.

More specifically, the present invention provides a low energy load leveling rear suspension for a solid axle that is controlled in a vertical plane by a pair of upper control arms and a single lower control arm. A pair of torsion bar springs are situated parallel to the axle and have load lever arms overlying the upper control arms. Actuatable roller device is interposed between each control arm and load arm. The other ends of the bars are anchored to the frame.

Movement of the suspension as the vehicle settles under an increased load is sensed by an electric leveling switch which energizes an electric motor to actuate a jack screw. The jack screw shifts the roller intermediate the torsion bar load arm and the suspension control arm. This action shortens the effective length of the torsion bar load arms and lengthens the effective load arm length of the upper control arms. This change in effective length changes the lever ratio between the torsion bars and the sprung load on the upper control arms. Such action increases the mechanical ratio through which the torsion bar spring acts to support the sprung load and, as a result, increases the height of the sprung load. The reverse action takes place upon a decrease in sprung load.

It is the principal object of the present invention to provide a vehicle suspension system having low energy load leveling capabilities.

More specifically, it is a principal object of the present invention to provide a load leveling mechanism for a suspension system in which the mechanical advantage through which the suspension spring operates is changed to effect load leveling.

Other objects of the present invention include its incorporation in a suspension having a shiftable roller device interposed between a suspension arm and a torsion bar load lever arm of an independent front suspension system.

Other advantages claimed for this invention include variable rate springing. Upon increase of vehicle loading and the actuation of the levelizer so as to change the mechanical ratio between the suspension spring and the sprung mass, a change in spring rate is also encountered. In effect, the vehicle is leveled by making the springs "stiffer." An increase in spring rate is highly desirable for increased loads. It is highly advantageous to have stiff springs for a heavily loaded vehicle and soft springs for an unloaded vehicle. In the usual truck, the springs are consistently stiff, giving a very rough ride when the vehicle is unloaded. With the present invention improved ride is achieved under all load conditions.

These and further advantages of the present invention will become apparent from the following description and the accompanying drawings, in which:

FIGURE 1 is a top plan view of a vehicle suspension incorporating the present invention;

FIGURE 2 is a side elevational view of the suspension in FIGURE 1;

FIGURE 3 is an end elevational view of the axle and attachment brackets of FIGURE 1;

FIGURE 4 is a sectional view taken along lines 4—4 of FIGURE 2;

Figure 5:
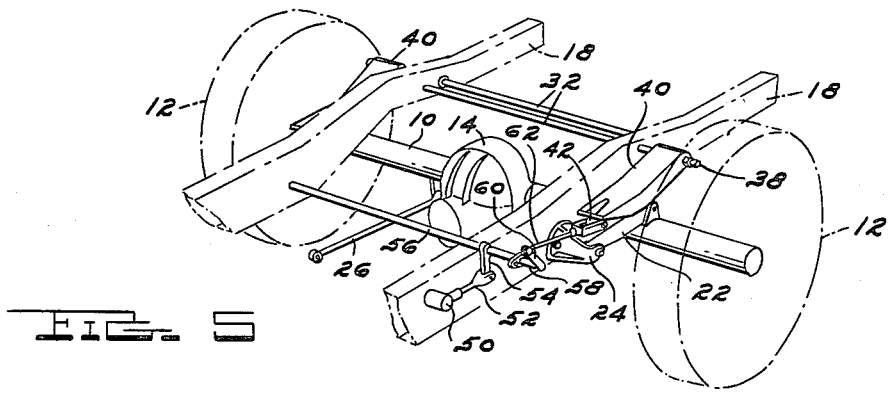
FIGURE 5 is a perspective of the suspension disclosed in FIGURE 1.

Referring now to the drawings for a detailed description of the present invention, wherein the presently preferred embodiments are disclosed, FIGURE 1 presents a rear suspension system for a vehicle having a solid axle. The vehicle's unsprung components include an axle 10 and a pair of left and right wheels 12. Positioned midpoint on the axle 10 is a differential housing 14 having a portion of a drive shaft 16 connected thereto. The sprung portion of the vehicle includes a pair of frame side rails 18 that are joined by cross-frame member 20.

The axle 10 is positioned relative to the frame members 18 by a pair of pivotally mounted upper control arms 22. The arms 22 are pivotally connected to the frame side rails 18 by bracket members 24 and to the axle 10 by brackets 23. A single lower control arm 26 is connected by a bracket 28 depending from the axle 10. The forward end of the arm 26 is pivotally connected to the chassis by a bracket 30 extending downwardly from the cross-frame member 20. The axle 10 is positioned laterally of the vehicle frame by means of a transversely disposed track bar (not shown).

Positioned rearwardly of the axle housing 10 are a pair of transversely arranged straight torsion bars 32. The torson bars 32 have one end secured against rotation in the frame members 18 as at 34. The other end of the torson bars 32 is journaled at 36 in the opposite frame member 18 and has an end 38 extending outwardly therefrom. A forwardly extending load arm 40 is secured to the end 38 of each torsion bar 32. The arms 40 are channel-shaped members and extend forwardly in an overlapping relationship with the control arms 22. As noted in the side elevation view, FIGURE 2, arms 40 have a generally upwardly curved configuration.

A roller assembly 42 is interposed between each control arm 22 and load lever arm 40. The roller assembly 42 permits the transfer of load from the sprung mass through the springs to the unsprung mass. The assembly 42 comprises a shaft 44 carrying a central roller 46 which rides on the arm 22 and a pair of outer rollers 48 that track within the channel shaped load arm 40.

Means are provided for positioning the roller assemblies 42 relative to the control arms 22 and load arms 40. The positioning means include an electric motor 50 which is adapted to drive a jack screw 52. The end of the jack screw 52 engages a crank arm 54 secured to a leveling arm shaft 56 extending transversely of the vehicle and having its ends journaled in bearing members 58 carried by the outboard side of the frame side rails 18. The outer ends of the shaft 56 have lever arms 60 secured thereto that pivotally engage push rods 62. The push rods 62 each have a bifurcated end connected to a roller assembly 42.

When the electric motor 50 is actuated, the jack screw 52 is driven inwardly or outwardly in response to the appropriate signal. In turn, the shaft 56 is rotated and forces the lever arms 60 to position the roller assembly 42 by means of the push rods 62.

Figure 6:
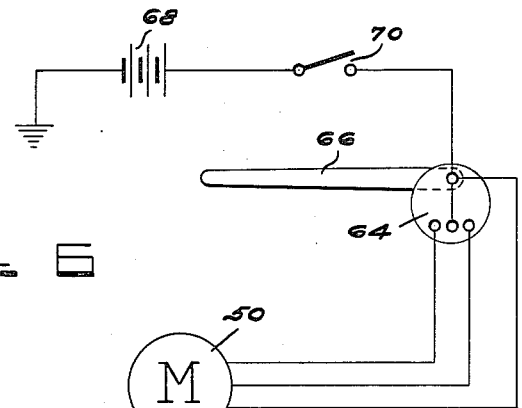
FIGURE 6 is an electrical circuit diagram of the actuating system for the device of FIGURE 1.

FIGURE 6 discloses a typical electric circuit for actuating the motor 50. The motor 50 is of the reversible D.C. variety and its direction of rotation is controlled by a leveling switch 64. The switch 64 is normally open but is actuatable to either of two closed positions by a flexible arm 66. A D.C. power supply 68 and a manual override switch 70 complete the circuit. As seen in FIGURE 1, the leveling switch 64 is secured to the crossframe member 20 and has the arm 66 extending therefrom in engagement with the differential housing 14. This construction makes the leveling switch 64 responsive in its control of the motor 50 to the relative position of sprung and unsprung vehicle components. In the present instance, these components are the frame member 20 and the differential 14.

The operation of the leveling mechanism of FIGURES 1 through 5 occurs in the following fashion. Assume that the suspension system is incorporated in a vehicle and a load is placed upon it to depress the frame members 18 relative to the ground and the unsprung vehicle components resting upon the ground. Such movement will be immediately sensed by the arm 66 and leveling switch 64. The motor 50 will be actuated to draw the jack screw 52 inwardly rotating the lever arms 54 and 60 in a clockwise direction as seen in FIGURE 2. The roller assembly 42 will be forced rearwardly. Rearward movement of the roller 42 shortens the effective length of the torsion bar load arms 40 (the distance between the pivot at 38 and the roller 42). At the same time, the effective load arm length of the upper control arm 22 will be increased (the distance between the pivot at the bracket 24 and the roller 42). This change in effective lengths changes the lever ratio between the torsion bars and sprung load on the upper control arms. The leveling system continues ot change this ratio until a level height and the initial torque in the torsion bars is restored. At this point, the leveling switch 64 opens and the motor circuit and leveling action stops.

When the load is removed, the leveling switch 64 senses an increase in riding height and causes a second set of contacts to complete the motor circuit for reverse rotation. The leveling shaft 56 is driven in a counterclockwise direction to reverse the cycle described above.

The present device provides a low energy leveling mechanism because the multiplication ratio between the applied wheel sprung load and the load on the elastic member of the suspension system is changed. The ratio change is such that the load on the elastic member is the same before and after a leveling cycle has occured. Rather than changing the amount of energy stored in the suspension spring, the present device merely changes the mechanical ratio through which it operates in supporting the sprung mass to affect a leveling action. The power required for leveling will be at a minimum since the system is not required to add or subtract energy from that stored in the spring.

A further advantage realized with the present invention is a change in effective spring rate. With an increase in load and the resulting shortened load arm, the torsion bar has an increase in effective spring rate. A higher spring rate is most desirable for heavily laden vehicles, particularly trucks.

Figure 7:
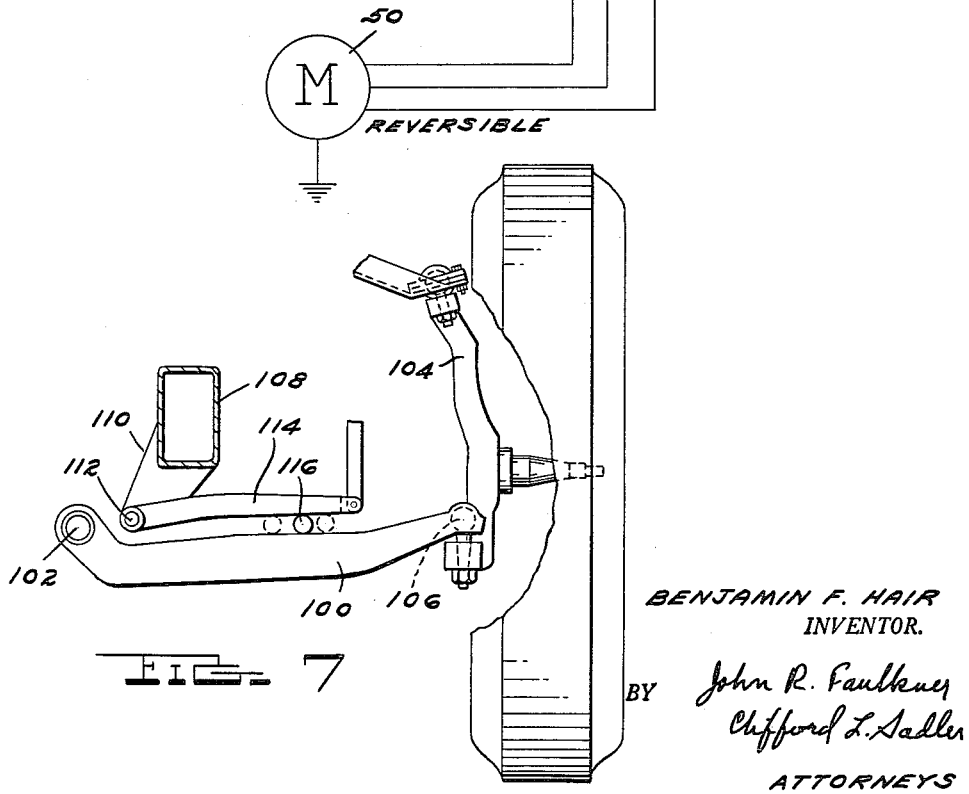
FIGURE 7 is a front elevational view of an independent front suspension incorporating the present invention.

FIGURE 7 illustrates an embodiment of the present invention for an independent front suspension system. A lower support arm 100 is shown having an inner pivot axis 102 connected to a frame member or other sprung component. The outer end of the arm 100 is joined to a wheel spindle 104 by a ball joint connection 106. A side rail member 108 of a chassis frame is shown having a bracket 110 that pivotally supports a torsion bar 112. A load arm 114 is rigidly connected to the end of the torsion bar 112 and extends transversely in overlapping relationship to the lower arm 100. A roller 116 is interposed between the load arm 114 and the suspension arm 100.

Appropriate sensing means and positioning means are provided for displacing the roller 116 relative to the inner pivot of the arm 114. By changing the effective arm lengths ratio (the ratio of the distance between torsion bar 112 and roller 116 to the distance between the pivot 102 and the roller 116) leveling may be achieved. The actuating or positioning mechanism for roller 116 may be an adaptation of the device disclosed in FIGURE 1. The change in ratio effects a leveling action in the same manner as the structure of the principal embodiment of the invention (FIGURE 1).

The foregoing description constitutes the presently preferred embodiment and modification of this invention. Other modifications and embodiments may occur to those skilled in the art which will come in the scope and spirit of the following claims.

I claim:

1. A suspension system for a vehicle having a pair of wheels joined by a rigid axle housing, sprung frame structure positioned relative to said housing by a pair of pivotally mounted longitudinally extending control arms, a pair of transversely disposed torsion bar springs each having longitudinally extending load arms overlying said control arms, an intermediate load bearing member interposed between said control arms and load arms, said member being adapted to transfer sprung load to unsprung portions of the vehicle, means for positioning said intermediate member relative to said load arm in response to the vertical height between said frame structure and axle housing.

2. A suspension system for a vehicle having a pair of wheels joined by a rigid axle housing, sprung frame structure positioned relative to said housing by a pair of pivotally mounted longitudinally extending control arms, a pair of transversely disposed torsion bar springs each having longitudinally extending load arms overlying said control arms, an intermediate load bearing member interposed between each set of said control arms and load arms, said member being adapted to transfer sprung load to unsprung portions of the vehicle, means for positioning said intermediate member relative to said load arm in response to the vertical height between said frame structure and axle housing, said means comprising a transversely situated motor actuated shaft having crank arms engaging said intermediate member.

3. The combination of claim 2 wherein one end of each of said torsion bar springs is journalled to provide pivot means for said load arms, the axes of said pivot means being disposed on one side of said axle housing and the pivotal connection of said control arms with said frame structure being on the other side of said housing.

References Cited in the file of this patent

UNITED STATES PATENTS

| | | |
|---|---|---|
| 2,033,493 | Straussler | Mar. 10, 1936 |
| 2,957,701 | Rich | Oct. 25, 1960 |
| 2,984,501 | Mercier | May 16, 1961 |